United States Patent
Nakazato

(10) Patent No.: US 9,819,813 B2
(45) Date of Patent: Nov. 14, 2017

(54) INFORMATION PROCESSING SYSTEMS WITH A DIGITAL FRONT AND AN IMAGE FORMING APPARATUS THAT SAVE ERROR LOGS BASED ON WHICH DEVICE CAUSED IN ERROR

(71) Applicant: Harufumi Nakazato, Tokyo (JP)

(72) Inventor: Harufumi Nakazato, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/260,195

(22) Filed: Sep. 8, 2016

(65) Prior Publication Data

US 2017/0078497 A1   Mar. 16, 2017

(30) Foreign Application Priority Data

Sep. 15, 2015   (JP) .................................. 2015-181659

(51) Int. Cl.
   *H04N 1/00* (2006.01)
(52) U.S. Cl.
   CPC ....... *H04N 1/00037* (2013.01); *H04N 1/0009* (2013.01); *H04N 1/00204* (2013.01); *H04N 1/00832* (2013.01); *H04N 2201/0094* (2013.01)
(58) Field of Classification Search
   None
   See application file for complete search history.

(56) References Cited

U.S. PATENT DOCUMENTS

| | | | | |
|---|---|---|---|---|
| 6,567,175 B1* | 5/2003 | Lee | ....................... | G06F 9/4411 358/1.13 |
| 6,718,490 B1* | 4/2004 | Takemoto | ........... | G06F 11/0733 714/47.1 |
| 8,503,003 B2 | 8/2013 | Kurahashi | | |
| 9,495,233 B2* | 11/2016 | McNairy | ............. | G06F 11/2215 |
| 2003/0077097 A1* | 4/2003 | Parry | ..................... | G06F 3/121 400/74 |
| 2003/0112452 A1* | 6/2003 | McIntyre | ............ | G06F 11/0733 358/1.1 |
| 2006/0039708 A1* | 2/2006 | Doty | .................... | G03G 15/553 399/24 |

(Continued)

FOREIGN PATENT DOCUMENTS

| | | |
|---|---|---|
| JP | 2012-014588 | 1/2012 |
| JP | 5121518 | 1/2013 |

*Primary Examiner* — Ming Hon
(74) *Attorney, Agent, or Firm* — Duft Bornsen & Fettig LLP

(57) ABSTRACT

An information processing system includes a first device configured to manage a log, and a second device coupled to the first device. The information processing system includes a first determination unit configured to detect an error occurring in the first device or the second device, and determine whether the detected error is caused by the first device; a second determination unit configured to determine whether log information including a log of the error can be saved in the first device before restarting the first device, when the first determination unit determines that the error is caused by the first device; and a saving unit configured to save the log information in the first device after restarting the first device, when the second determination unit determines that the log information cannot be saved in the first device before restarting the first device.

5 Claims, 9 Drawing Sheets

(56) References Cited

U.S. PATENT DOCUMENTS

| | | | |
|---|---|---|---|
| 2006/0291871 A1* | 12/2006 | Yamaguchi | H04N 1/00002 399/8 |
| 2007/0014614 A1* | 1/2007 | Yoshida | G03G 15/5016 400/62 |
| 2008/0018651 A1* | 1/2008 | Huang | G06F 11/0787 345/501 |
| 2013/0250370 A1* | 9/2013 | Kojima | H04N 1/00005 358/405 |
| 2014/0019581 A1* | 1/2014 | Baillargeon | H04W 28/12 709/217 |
| 2015/0067312 A1* | 3/2015 | Lewandowski | G06F 1/26 713/2 |
| 2016/0188263 A1* | 6/2016 | Sueishi | G06F 3/1205 358/1.15 |
| 2017/0078522 A1* | 3/2017 | Kogusuri | H04N 1/32609 |

* cited by examiner

| ERROR NUMBER | ERROR CAUSE EQUIPMENT | REPORT CATEGORY |
|---|---|---|
| E001 | CONTROL DEVICE | IMMEDIATELY |
| E002 | IMAGE FORMATION APPARATUS | – |
| E003 | CONTROL DEVICE | AFTER RESTART |

INFORMATION PROCESSING SYSTEMS WITH A DIGITAL FRONT AND AN IMAGE FORMING APPARATUS THAT SAVE ERROR LOGS BASED ON WHICH DEVICE CAUSED IN ERROR

CROSS-REFERENCE TO RELATED APPLICATIONS

The present application claims benefit of priority under 35 U.S.C. §119 of Japanese Patent Application No. 2015-181659, filed Sep. 15, 2015. The contents of this application are incorporated herein by reference in their entirety.

BACKGROUND OF THE INVENTION

1. Field of the Invention

The disclosures herein generally relate to an information processing system, an information processing apparatus and an information processing method.

2. Description of the Related Art

Technique referred to as production printing for printing a great amount of documents for business use, documents of high resolution or the like has been known. In the production printing, printing or the like is performed in an image forming apparatus coupled to a DFE (Digital Front End).

Moreover, a technique for outputting log information used for maintenance management of the image forming apparatus has been known (See, for example, Japanese Patent No. 5121518).

SUMMARY OF THE INVENTION

It is a general object of at least one embodiment of the present invention to provide an information processing system, an information processing apparatus, and an information processing method that substantially obviate one or more problems caused by the limitations and disadvantages of the related art.

In one embodiment, an information processing system includes a first device configured to manage a log, and a second device coupled to the first device. The information processing system includes a first determination unit configured to detect an error occurring in the first device or the second device, and determine whether the detected error is caused by the first device; a second determination unit configured to determine whether log information including a log of the error can be saved in the first device before restarting the first device, when the first determination unit determines that the error is caused by the first device; and a saving unit configured to save the log information in the first device after restarting the first device, when the second determination unit determines that the log information cannot be saved in the first device before restarting the first device.

BRIEF DESCRIPTION OF THE DRAWINGS

Other objects and further features of embodiments will become apparent from the following detailed description when read in conjunction with the accompanying drawings, in which:

FIG. 5 is a diagram depicting an example of error determination information;

DESCRIPTION OF THE PREFERRED EMBODIMENTS

In the following, embodiments of the present invention will be described with reference to the accompanying drawings.

<System Configuration>

Figure 1:
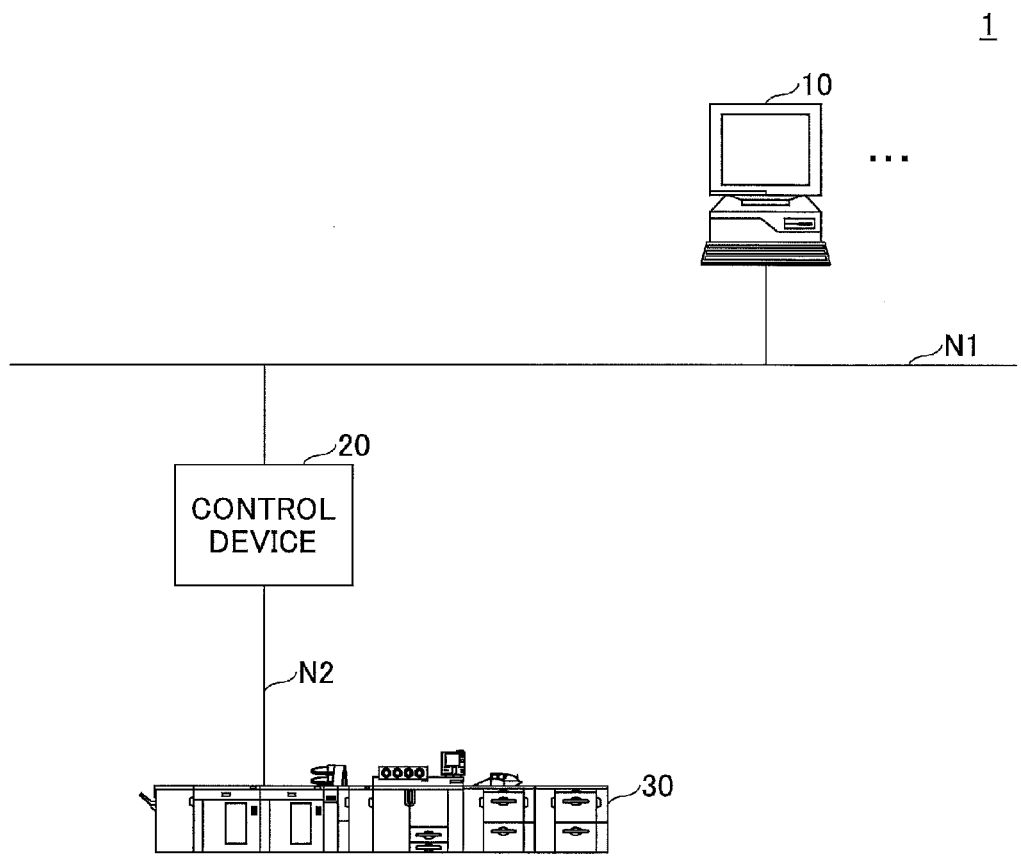
FIG. 1 is a diagram depicting an example of a system configuration of a print system according to an embodiment.

At first a print system 1 according to an embodiment will be described with reference to FIG. 1. FIG. 1 is a diagram depicting an example of a system configuration of the print system according to the embodiment.

The print system 1 according to the embodiment includes a terminal device 10, a control device 20 and an image forming apparatus 30. The terminal device 10 and the control device 20 are coupled to each other for a communications connection via a network N1 such as a LAN (Local Area Network). Moreover, the control device 20 and the image forming apparatus 30 are coupled to each other for a communications connection via a broadband network N2 such as a gigabit Ethernet LAN.

The terminal device 10 is a desktop PC (personal computer) that a user of the print system 1 uses, a laptop PC or the like. The terminal device 10 can accept an operation of the user and generate a print job. The terminal device 10 may be a smartphone, a tablet type terminal, a gaming machine or the like.

The control device 20 is a DFE or the like. One or more image forming apparatuses 30 are coupled to the control device 20 via the network N2. Based on a print job received from the terminal device 10, the control device 20 generates print data printable at the image forming apparatus 30 and sends the data to the image forming apparatus 30.

Moreover, the control device 20 acquires and manages information pertaining to an operation log or an error log in the control device 20 and in the image forming apparatus 30 coupled to the control device 20 via the network N2. In the following, the information pertaining to the operation log or the error log in the control device 20 and in the image forming apparatus 30 will be referred to as "log information".

The image forming apparatus 30 is, for example, a printer for production (production printer) or an MFP (Multifunction peripheral). The image forming apparatus 30 prints print data received from the control device 20.

When a predetermined error occurs in the control device 20, for example, the image forming apparatus 30, prompts the user to restart the control device 20 and the image forming apparatus 30, and after the restarting, gives notice to the control device 20 to save log information of the error. The predetermined error includes, for example, an error requiring restarting for restoration, such as an error by which the control device 20 freezes (halts).

In this way, according to the embodiment, when the predetermined error occurs in the control device 20, after the control device 20 restarts, the image forming apparatus 30 causes the control device 20 to save log information of the error. Therefore, in the print system 1 according to the embodiment, log information can be prevented from being lost due to occurrence of the predetermined error in the control device 20.

<Hardware Configuration>

Figure 2:
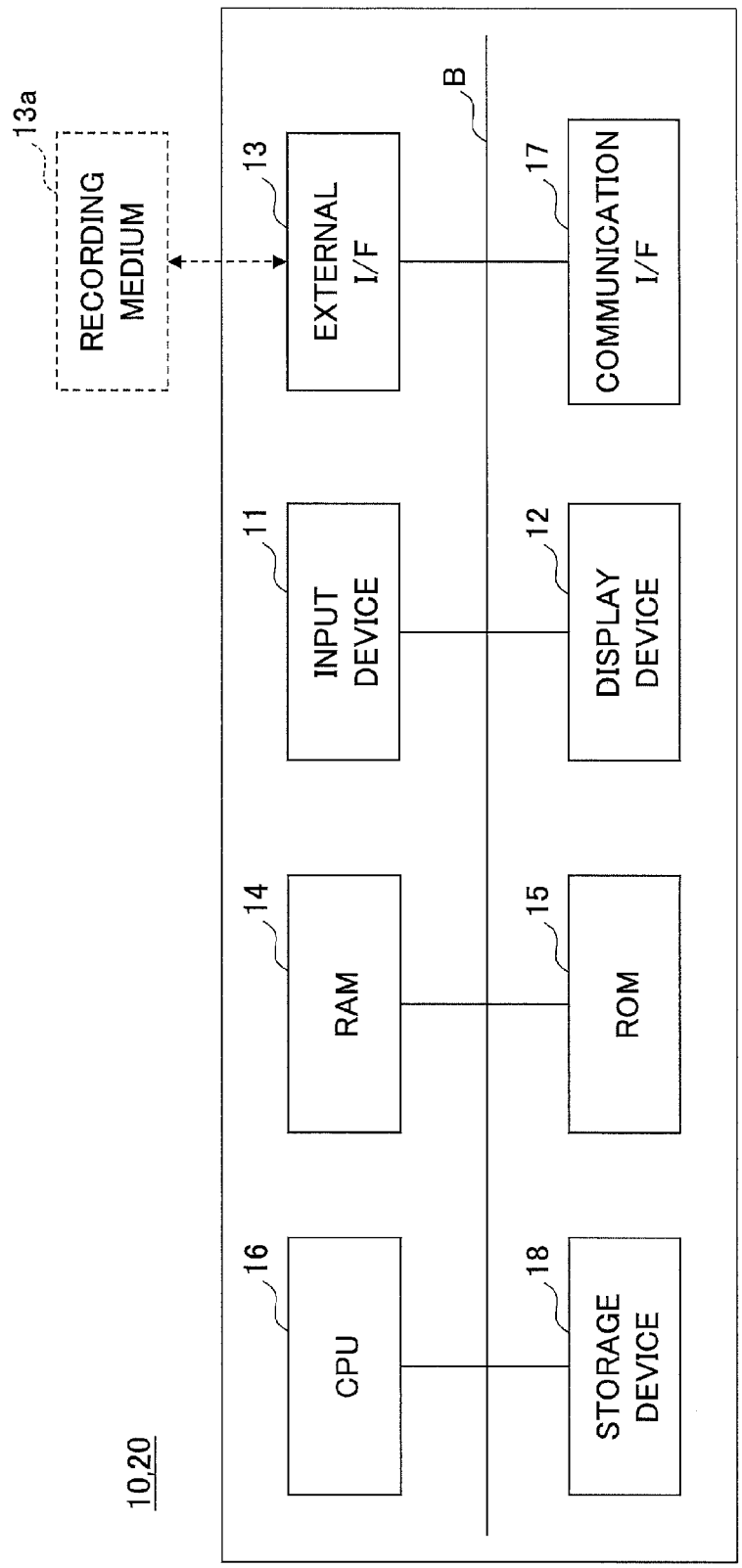
FIG. 2 is a diagram depicting an example of a hardware configuration of a terminal device and a control device according to the embodiment.

Next, a hardware configuration of the print system 1 according to the embodiment will be described. At first, a hardware configuration of the terminal device 10 and the control device 20 included in the print system 1 according to the embodiment will be explained with reference to FIG. 2. FIG. 2 is a diagram depicting an example of the hardware configuration of the terminal device and the control device according to the embodiment. Because the terminal device 10 and the control device 20 have the same hardware configuration, in the following, mainly the hardware configuration of the control device 20 will be described.

The control device 20 includes an input device 11, a display device 12, an external I/F 13, and a RAM (Random Access Memory) 14. Moreover, the control device includes a ROM (Read-Only Memory) 15, a CPU (Central Processing Unit) 16, a communication I/F 17, and a storage device 18. These pieces of hardware are coupled to each other via a bus B.

The input device 11 is a touch panel, a variety of buttons or the like, and used for performing a variety of operations for the control device 20. For the input device 11, a keyboard, a mouse or the like may be used. The display device 12 is a display or the like, and displays results of a variety of processes in the control device 20. The input device 11 and/or the display device 12 may be coupled to the bus B for use when necessary.

The external I/F 13 is an interface with an external device. The external device is, for example, a recording medium 13a, such as a CD (Compact Disk), a DVD (Digital Versatile Disk), an SD memory card, or a USB (Universal Serial Bus) memory. The control device 20 can read/write from/into the recording medium 13a via the external I/F 13.

The RAM 14 is a volatile semiconductor memory that temporarily stores a program or data. The ROM 15 is a nonvolatile semiconductor memory that can retain data even when power is off. The CPU 16 is an arithmetic device that reads out a program or data from the storage device 18, the ROM 15 or the like onto the RAM 14 and executes a variety of processes.

The communication I/F 17 is an interface for connecting the control device 20 to the network N1 and the network N2.

The storage device 18 is a nonvolatile memory that stores a program or data, and is, for example, a HDD (Hard Disk Drive) or a SSD (Solid State Drive). The program or data stored in the storage device 18 include, for example, an OS (Operating System) that is basic software for controlling the entire control device 20, a variety of programs operating on the OS or the like.

The terminal device 10 and the control device 20 according to the embodiment can enable a variety of processes, which will be described later, by the hardware configuration illustrated in FIG. 2.

Figure 3:
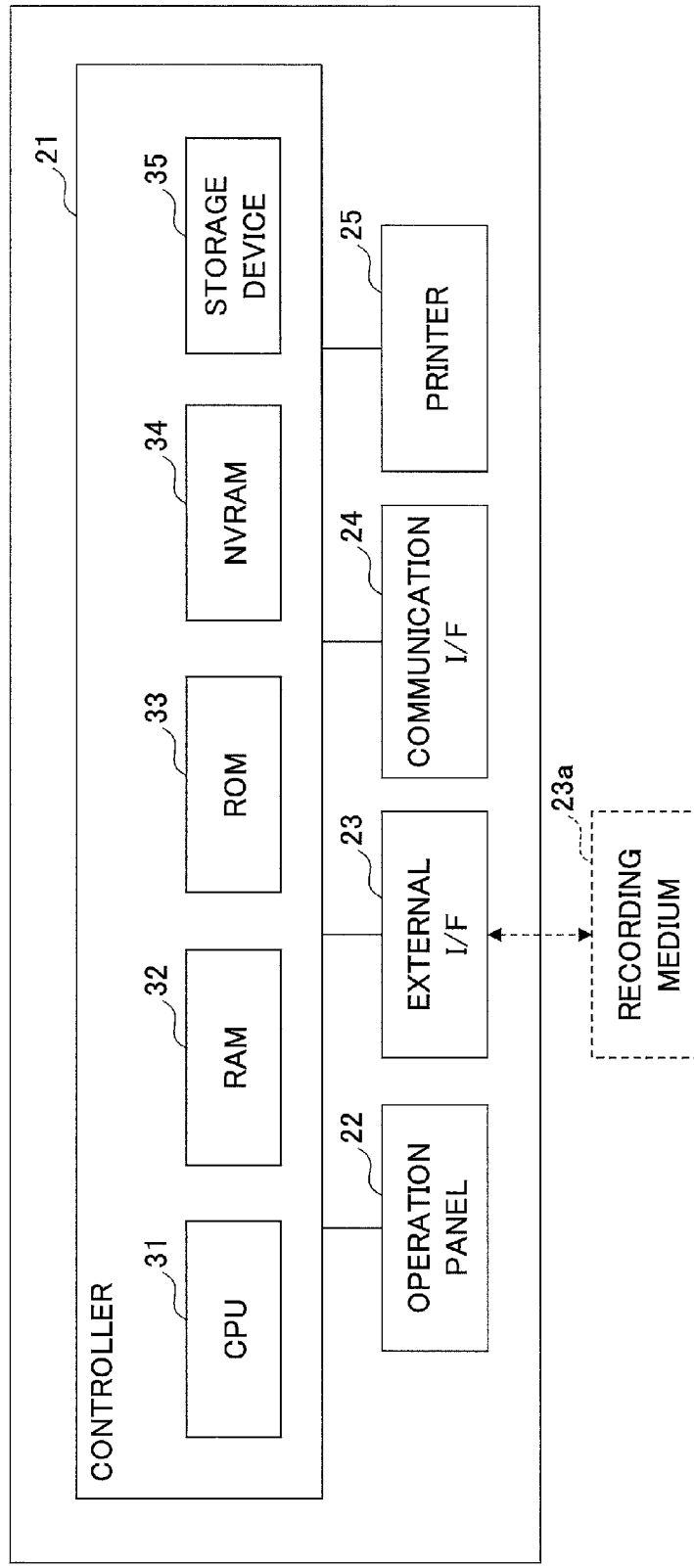
FIG. 3 is a diagram depicting an example of a hardware configuration of an image forming apparatus according to the embodiment.

Next, a hardware configuration of the image forming apparatus 30 included in the print system 1 according to the embodiment will be explained with reference to FIG. 3. FIG. 3 is a diagram depicting an example of a hardware configuration of the image forming apparatus according to the embodiment.

The image forming apparatus 30 includes a controller 21, an operation panel 22, an external I/F 23, a communication I/F 24, and a printer 25. Moreover, the controller 21 includes a CPU 31, a RAM 32, a ROM 33, an NVRAM 34 and a storage device 35.

The RAM 32 is a volatile semiconductor memory that temporarily saves a program or data. The ROM 33 is nonvolatile semiconductor memory that retains data even when the power is off. The NVRAM 34 stores, for example, setting information or the like. Moreover, the storage device 35 is a non-volatile memory that stores a program or data, and is a HDD or the like.

The CPU 31 reads out a program, data, setting information, or the like from the ROM 33, the NVRAM 34, the storage device 35 or the like onto the RAM 32 and executes a process, and thereby enables a control or a function of the entire image forming apparatus 30.

The operation panel 22 includes an input unit for accepting an input from a user and a display unit for performing display. The external I/F 23 is an interface with an external device. The external device includes, for example, a recording medium 23a such as a CD, a DVD, an SD memory card, or a USB memory.

The communication I/F 24 is an interface for connecting the image forming apparatus 30 to the network N2. The printer is a printing device for printing print data.

The image forming apparatus 30 according to the embodiment enables a variety of processes, which will be described later, by the hardware configuration illustrated in FIG. 3.

<Functional Configuration>

Figure 4:
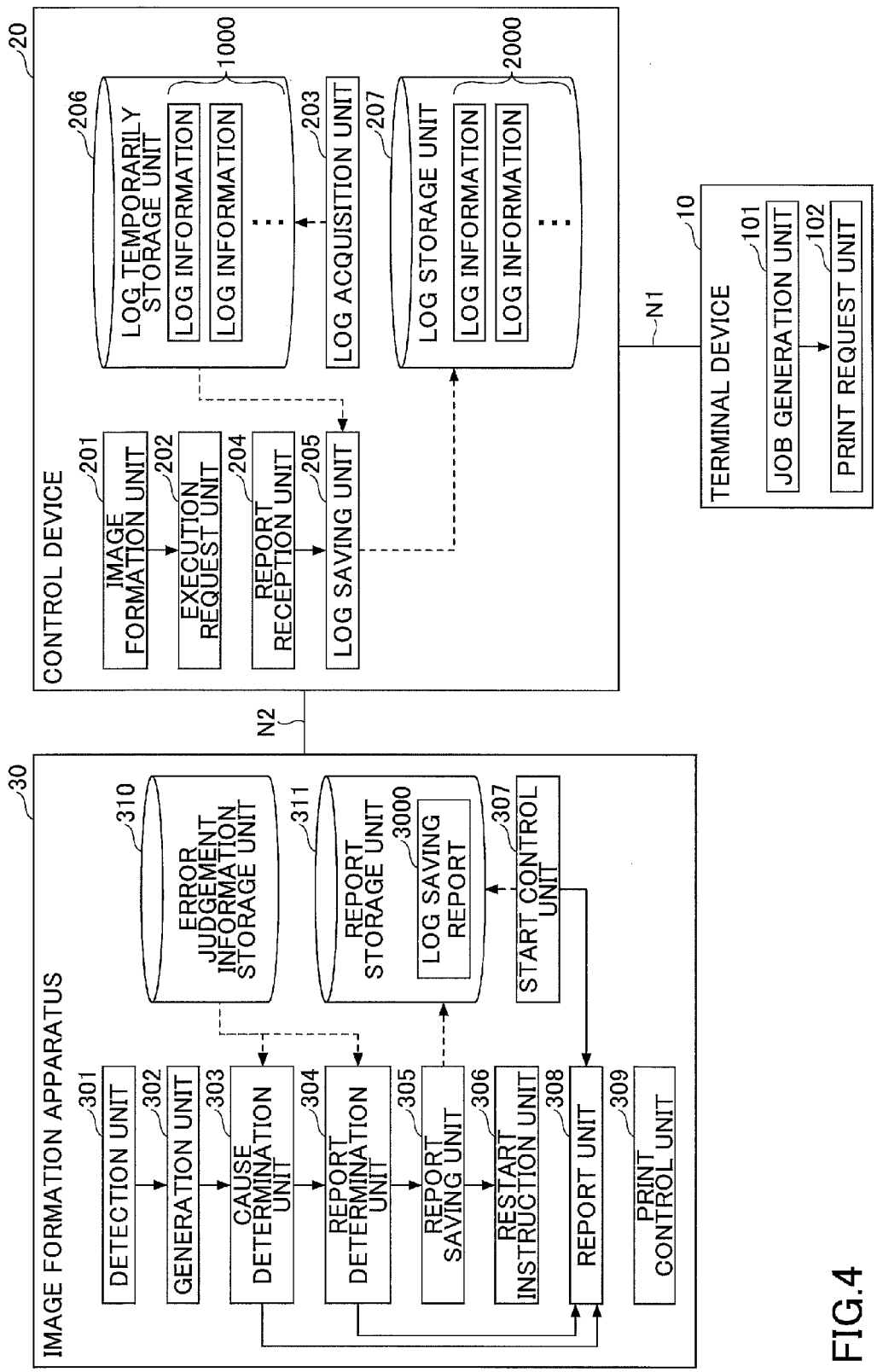
FIG. 4 is a diagram depicting an example functional configuration of the print system according to the embodiment.

Next, a functional configuration of the print system 1 according to the embodiment will be described with reference to FIG. 4. FIG. 4 is a diagram depicting an example of a functional configuration of the print system according to the embodiment.

The terminal device 10 includes a job generation unit 101 and a print request unit 102. The respective units are enabled by processes that one or more programs installed in the terminal device 10 cause the CPU 16 to execute.

The job generation unit 101 generates a print job in response to an operation by a user. For example, when document data or image data that are print objects are specified by a user in a variety of applications, such as an image creation application, or a document preparation application and a print instruction is issued, the job generation unit 101 generates print object data from the document data or the like. Then, the job generation unit 101 generates a print job including the print object data.

The print object data are, for example, data obtained by converting image data in the image creation application or document data in the document preparation application into a PDL (Page Document Language) format, such as PostScript, XPS or the like.

When the job generation unit 101 generates a print job, the print request unit 102 sends a print request including the print job to the control device 20.

The control device 20 includes an image processing unit 201, an execution request unit 202, a log acquisition unit 203, a report reception unit 204, and a log saving unit 205.

The respective units are enabled by processes that one or more programs installed in the control device 20 cause the CPU 16 to execute.

Moreover, the control device 20 includes a log temporary storage unit 206 and a log storage unit 207. The respective units are enabled by using the storage device 18. The log temporary storage unit 206 and/or the log storage unit 207 may be enabled by using a storage device or the like coupled to the control device via a network.

When a printing request from the terminal device 10 is received, the image processing unit 201 generates print data from print object data included in the print job. That is, the image processing unit 201 performs a RIP process (also referred to as "RIP" or "ripping") for the print object data to generate print data.

When the print data are generated by the image processing unit 201, the execution request unit 202 sends print execution request including the print data to the image forming apparatus 30.

The log acquisition unit 203 acquires log information pertaining to an operation log or an error log in the control device 20 and in the image forming apparatus 30. Then, the log acquisition unit 203 stores the acquired log information into the log temporary storage unit 206.

The report reception unit 204 receives a log saving report from the image forming apparatus 30. Here, the log saving report is a report that requests the log storage unit 207 to store (accumulate) the log information 1000 stored in the log temporary storage unit 206.

When the log saving report is received by the report reception unit 204, the log saving unit 205 stores the log information 1000 stored in the log temporary storage unit 206 into the log storage unit 207.

The log temporary storage unit 206 stores the log information acquired by the log acquisition unit 203. Here, the log temporary storage unit 206 is a ring buffer or the like that stores a predetermined number of pieces of log information.

For example, in a case where the log information 1000 includes log information $1000_1$, log information $1000_2$, and log information $1000_3$, when new log information $1000_4$ is stored in the log temporary storage unit 206 by the log acquisition unit 203, the oldest log information $1000_1$ is deleted. In this way, in the log temporary storage unit 206, when new log information is stored by the log acquisition unit 203, the oldest log information included in the log information 1000 is deleted.

The log storage unit 207 stores (accumulates) the log information 1000 saved by the log saving unit 205. That is, the log storage unit 207 stores log information 2000, in which the log information 1000 stored in the log temporary storage unit 206 is accumulated.

The image forming apparatus 30 includes a detection unit 301, a generation unit 302, a cause determination unit 303, a report determination unit 304, a report saving unit 305, a restart instruction unit 306, a start control unit 307, a report unit 308, and a print control unit 309. The respective units are enabled by processes that one or more programs installed in the image forming apparatus 30 cause the CPU 31 to execute.

Moreover, the image forming apparatus 30 includes an error determination information storage unit 310, and a report storage unit 311. The respective units can be enabled by using the storage device 35. The error determination information storage unit 310 and/or the report storage unit 311 may be enabled by a storage device or the like that is coupled to the image forming apparatus 30 via a network.

The detection unit 301 detects an error occurring in the control device 20 or the image forming apparatus 30. That is, the detection unit 301, when an error occurs in the control device 20 or the image forming apparatus 30, detects the occurring error.

When the occurrence of error is detected by the detection unit 301, the generation unit 302 generates a log saving report 3000.

The cause determination unit 303 determines an error cause device of the error detected by the detection unit 301 based on error determination information 4000 stored in the error determination information storage unit 310. Here, the error cause device is a device that is the cause of the error detected by the detection unit 301 (the control device 20 or the image forming apparatus 30).

When the cause determination unit 303 determines that the error cause device is the "control device 20", based on the error determination information 4000 stored in the error determination information storage unit 310, the report determination unit 304 determines a report category for the error detected by the detection unit 301. Here, the report category is a category pertaining to whether to send promptly the log saving report 3000 generated by the generation unit 302 to the control device 20, or to send it to the control device 20 after restarting the device (the control device 20 or the image forming apparatus 30).

When the report determination unit 304 determines that the log saving report 3000 is sent to the control device 20 after restarting the device, the report saving unit 305 stores the log saving report 3000 in the report storage unit 311.

When the report saving unit 305 stores the log saving report 3000 into the report storage unit 311, the restart instruction unit 306 gives notice prompting a user to restart the device.

When the image forming apparatus 30 is started, the start control unit 307 determines whether the log saving report 3000 is stored in the report storage unit 311. Then, when the report storage unit 311 is determined to store the log saving report 3000, the start control unit 307 passes the log saving report 3000 to the report unit 308.

When the report determination unit 304 determines that the log saving report 3000 is sent promptly, the report unit 308 sends the log saving report 3000 to the control device 20. Moreover, when the log saving report 3000 is passed by the start control unit 307, the report unit 308 sends the log saving report 3000 to the control device 20.

When the print execution request is received from the control device 20, the print control unit 309 performs a print process for the print data included in the print execution request. That is, the print control unit 309 controls the printer 25 to print the print data.

The error determination information storage unit 310 stores error determination information 4000. Here, the error determination information 4000 will be explained with reference to FIG. 5. FIG. 5 is a diagram depicting an example of error determination information.

As illustrated in FIG. 5, the error determination information 4000 includes as data items an error number, an error cause device, and a report category. The error number is identification information (identification number) for uniquely identifying an error occurring in the control device 20 and the image forming apparatus 30. The error cause device is a device that is a cause of occurrence of an error (the control device 20 or the image forming apparatus 30). The report category is a category pertaining to whether to send promptly the log saving report 3000 to the control device 20, or to send to the control device 20 after restarting the device. In this way, in the error determination information 4000, for each error number, a device that is a cause of occurrence of an error of the error number and a timing of sending the log saving report 3000 to the control device 20 are associated with each other.

For example, an error identified by the error number "E001" indicates that the device that is a cause of occurrence of the error is the "control device 20", and that the error is an error for which the log saving report 3000 can be sent to the control device 20 promptly. That is, the error identified by the error number "E001" can be said to be a minor error that does not cause the control device 20 to freeze, hang up, or the like.

In contrast, for example, an error identified by the error number "E003" indicates that the device that is a cause of occurrence of the error is the "control device 20", and that the error is an error for which the log saving report 3000 is required to be sent to the control device 20 after restarting the device. That is, the error identified by the error number "E003" can be said to be a major error that causes the control device 20 to freeze, hang up or the like.

Moreover, for example, an error identified by the error number "E002" indicates that the device that is a cause of occurrence of the error is the "image forming apparatus 30".

As described above, the report storage unit 311 stores the log saving report 3000 by the report saving unit 305.

<Details of Process>

Next, details of processes of the print system 1 according to the embodiment will be described.

Figure 6:
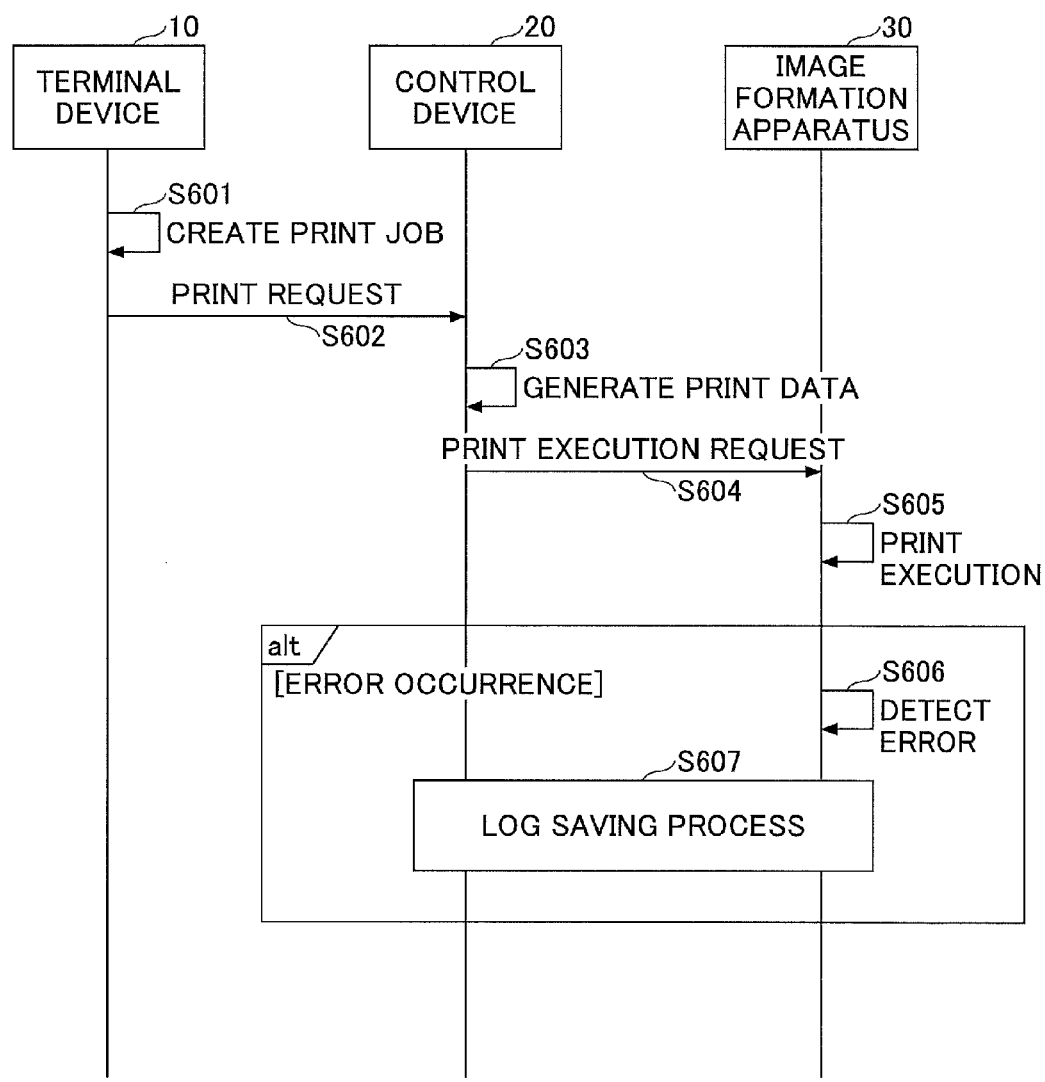
FIG. 6 is a sequence diagram depicting an example of a print process according to the embodiment.

In the following, a case where an error occurs during executing printing of print data in the image forming apparatus 30 will be described with reference to FIG. 6. FIG. 6 is a sequence diagram depicting an example of a print process according to the embodiment.

At first, in response to an operation of a user, the job generation unit 101 of the terminal device 10 generates a print job (step S601). That is, for example, when in a variety of applications such as an image creation application or a document preparation application, image data or document data that are print objects are specified by the user and a print instruction is performed, the job generation unit 101 generates print object data. Then, the job generation unit 101 generates a print job including the print object data.

Next, the print request unit 102 of the terminal device 10 sends a print request including the print job generated by the job generation unit 101 (step S602).

When the print request is received from the terminal device 10, the image processing unit 201 of the control device 20 performs the RIP process for print object data of the print job included in the print request, to generate print data (step S603). That is, the image processing unit 201, for example, rasterizes print object data to generate print data.

Next, when print data are generated by the image processing unit 201, the execution request unit 202 of the control device 20 sends a print execution request including the print data to the image forming apparatus 30 (step S604). The execution request unit 202 may, for example, perform data compression for print data with a predetermined method and send a print execution request including the print data after data compression to the image forming apparatus 30.

Here, in step S603, the image processing unit 201 may, for example, rasterize the print object data for each page, to generate print data in a page unit. In this case, in step S604, the execution request unit 202 sends a print execution request including print data in a page unit to the image forming apparatus 30. That is, the image processing unit 201 and the execution request unit 202 may, for example, in a unit of page of the print object data, repeat processes of step S603 and step S605.

When a print execution request is received from the control device 20, the print control unit 309 of the image forming apparatus 30 performs a print process for print data included in the print execution request (step S605). That is, the print control unit 309 controls the printer 25 to print the print data included in the print execution request.

Here, in the embodiment, assume that, in step S605, during the print process for the print data by the print control unit 309, an error occurs.

The detection unit 301 of the image forming apparatus 30 detects an error occurring in the image forming apparatus 30 or the control device 20 (step S606). Here, the error occurring in the image forming apparatus 30 or the control device 20 includes, for example, errors indicated by the following (1) through (4). The detection unit 301, for example, acquires an error number that uniquely identifies the error, to detect the occurrence of the error.

(1) Error indicating that wrong print data are generated in the image processing unit 201 of the control device 20 (data format error). This is a case where, for example, data format of print data generated by the image processing unit 201 is a data format, for which a print process cannot be performed in the print control unit 309 of the image forming apparatus 30, or the like.

(2) Error indicating that when data compression is performed for print data, the print data cannot be decompressed by the print control unit 309 of the image forming apparatus 30 (compression error).

(3) Error indicating that a network between the control device 20 and the image forming apparatus 30 is disconnected (or communication becomes disabled) (communication error).

(4) Error indicating receiving command (instruction) or data that the image forming apparatus 30 cannot recognize from the control device 20 (command error).

Next, when an occurrence of an error by the detection unit 301 is detected, the control device 20 and the image forming apparatus 30 perform a log saving process (step S607). That is, the control device 20 and the image forming apparatus 30 perform the log saving process for accumulating log information 1000 stored in the log temporary storage unit 206 in the log storage unit 207.

In the respective processes of step S603 through step S607, the log acquisition unit 203 acquires log information of the control device 20 and the image forming apparatus 30, and stores the log information in the log temporary storage unit 206.

For example, when print data are generated in step S603, the log acquisition unit 203 acquires log information pertaining to generating print data, and stores the log information in the log temporary storage unit 206. Moreover, similarly, when a print process is performed by the image forming apparatus 30 in step S605, the log acquisition unit 203 acquires log information indicating that the print process is performed, and stores the log information in the log temporary storage unit 206. Similarly, when an error is detected by the image forming apparatus 30 in step S606, the log acquisition unit 203 acquires log information indicating that the error occurs, and stores the log information in the log temporary storage unit 206.

Figure 7:
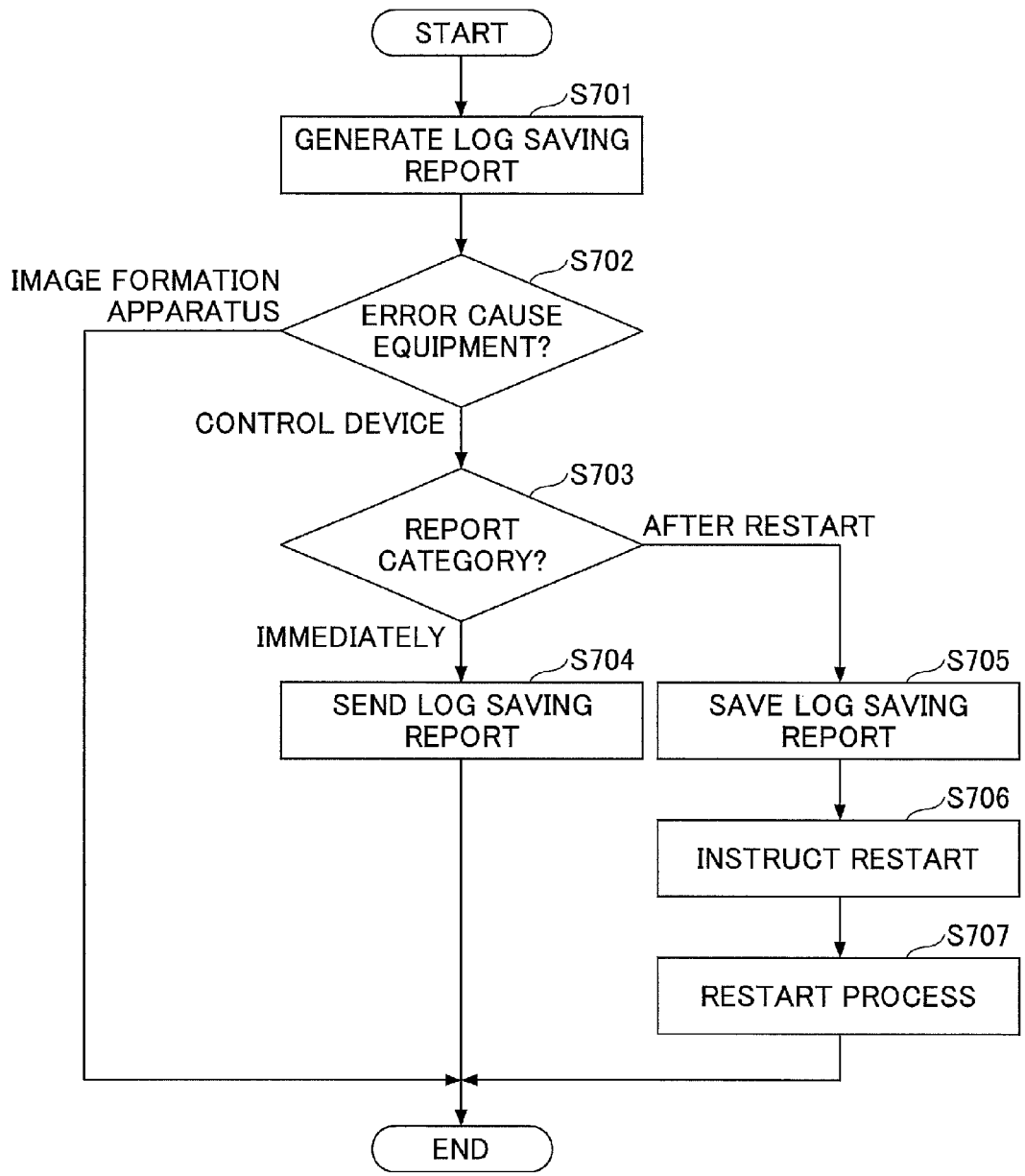
FIG. 7 is a flowchart depicting an example of a transmission process for log saving report in a log saving process according to the embodiment.

In the following, the log saving process at step S607 will be described in detail with reference to FIG. 7 through FIG. 10. At first, a process in the image forming apparatus 30 of sending a log saving report 3000 to the control device 20 will be described with reference to FIG. 7. FIG. 7 is a flowchart depicting an example of a process of sending a log saving report 3000 in the log saving process according to the embodiment.

When an occurrence of an error is detected by the detection unit 301, the generation unit 302 of the image forming apparatus 30 generates a log saving report 3000 for storing log information 1000 stored in the log temporary storage unit 206 of the control device 20 in the log storage unit 207 (step S701).

Next, based on error determination information 4000 stored in the error determination information storage unit 310, the cause determination unit 303 of the image forming apparatus 30 determines an error cause device for the error detected by the detection unit 301 (step S702).

More specifically, the cause determination unit 303 acquires an error number of the error detected by the detection unit 301, refers to a data item of the error cause device corresponding to the error number acquired in the error determination information 4000, and thereby determines the error cause device.

When the cause determination unit 303 determines that the error cause device is the "image forming apparatus 30" in step S702, the image forming apparatus 30 ends the process.

When the cause determination unit 303 determines that the error cause device is the "control device 20" in step S702, based on the error determination information 4000 stored in the error determination information storage unit 310, the report determination unit 304 of the image forming apparatus 30 determines a report category of the error detected by the detection unit 301 (step S703).

More specifically, the report determination unit 304 acquires an error number of the error detected by the detection unit 301, refers to a data item of a report category corresponding to the error number acquired in the error determination information 4000, and thereby determines the report category.

When the report determination unit 304 determines that the report category is "immediately" in step S703, the report unit 308 of the image forming apparatus 30 sends a log saving report (step S704). Therefore, in the control device 20, log information 1000 stored in the log temporary storage unit 206 is stored (accumulated) in the log storage unit 207. That is, in the control device 20, the log information 1000 including log information pertaining to the error detected by the detection unit 301 is accumulated in the log storage unit 207.

In this way, when the error is caused by the control device 20 and is a minor error (for example, an error by which the control device 20 does not freeze, hang up, or the like), the image forming apparatus 30 sends the log saving report 3000 immediately. Therefore, in the embodiment, for example, log information of an error that cannot be detected by the control device 20 although the error is a minor error (for example, a data format error, a command error) can be accumulated in the log storage unit 207.

When the report determination unit 304 determines that the report category is "after restart" in step S703, the report saving unit 305 of the image forming apparatus 30 stores the log saving report 3000 in the report storage unit 311 (step S705).

Next, when the log saving report 3000 is stored in the report storage unit 311 by the report saving unit 305, the restart instruction unit 306 of the image forming apparatus 30 performs report for prompting the user to restart the device (control device 20 and the image forming apparatus 30) (step S706).

Figure 8:
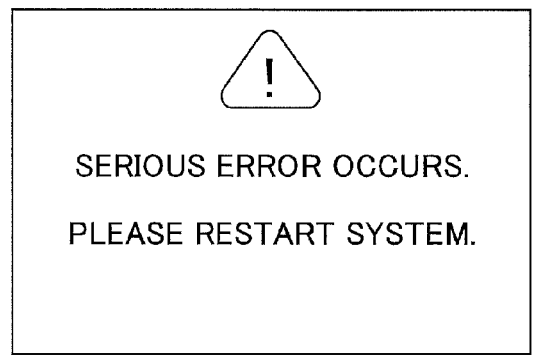
FIG. 8 is a diagram depicting an example of a restart instruction screen.

Here, the restart instruction unit 306, for example, displays a restart instruction screen 5000, as illustrated in FIG. 8, on the display device 12 of the terminal device 10, the display device 12 of the control device 20, or the operation panel 22 of the image forming apparatus 30. Therefore, the restart instruction unit 306 can cause the user to perform restart operation for the control device 20 and the image forming apparatus 30.

Therefore, when the error is caused by the control device 20, and the error is a major error (for example, an error by which the control device 20 freezes, hangs up, or the like), the restart instruction unit 306 can prompt the user to restart the control device 20 and the image forming apparatus 30.

A major error, by which the control device 20 freezes, hangs up, or the like, includes, for example, a communication error, a compression error, or the like. Moreover, other than the above, for example, the major error includes an error by which the OS or the like freezes due to an increase of a process load of the control device 20, or the like.

Figure 9:
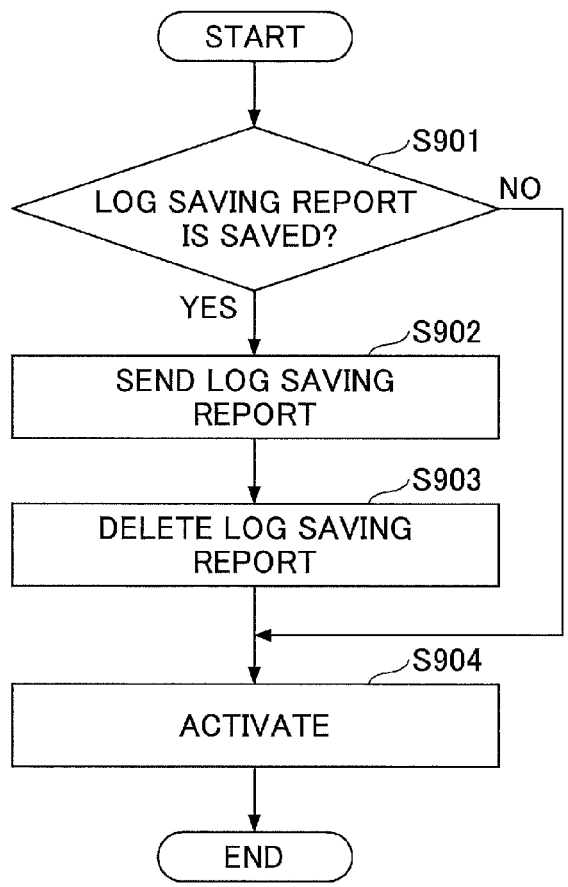
FIG. 9 is a flowchart depicting an example of a restart process according to the embodiment.

Subsequently, the image forming apparatus 30 performs a restart process in response to the restart operation by the user (step S707). Here, the restart process will be described in detail with reference to FIG. 9. FIG. 9 is a flowchart depicting an example of the restart process according to the embodiment.

At first, the start control unit 307 of the image forming apparatus 30 determines whether a log saving report 3000 is stored in the report storage unit 311 (step S901).

When the start control unit 307 determines that a log saving report 3000 is not stored in the report storage unit 311 in step S901, the start control unit 307 of the image forming apparatus 30 performs a process step S904. That is, in this case, the start control unit 307 performs the same process as the normal start.

When the start control unit 307 determines that a log saving report 3000 is stored in the report storage unit 311 in step S901, the start control unit 307 of the image forming apparatus 30 acquires the log saving report 3000 and passes the report to the report unit 308. Then, the report unit 308 sends the log saving report 3000 passed by the start control unit 307 to the control device 20 (step S902).

In this way, when the error is caused by the control device 20 and the error is a major error, after restarting the control device 20, the image forming apparatus 30 sends the log saving report 3000 to the control device 20. Therefore, for example, even when a major error, by which the control device 20 freezes, hangs up, or the like, occurs, log information 1000 including a log pertaining to an occurrence of the error can be accumulated in the log storage unit 207.

Next, when the log saving report 3000 is sent by the report unit 308 to the control device 20, the start control unit 307 of the image forming apparatus 30 deletes the log saving report 3000 from the report storage unit 311 (step S903).

Subsequently, the start control unit 307 of the image forming apparatus 30 performs control for starting the image forming apparatus 30 (step S904). Therefore, the image forming apparatus 30 starts.

Figure 10:
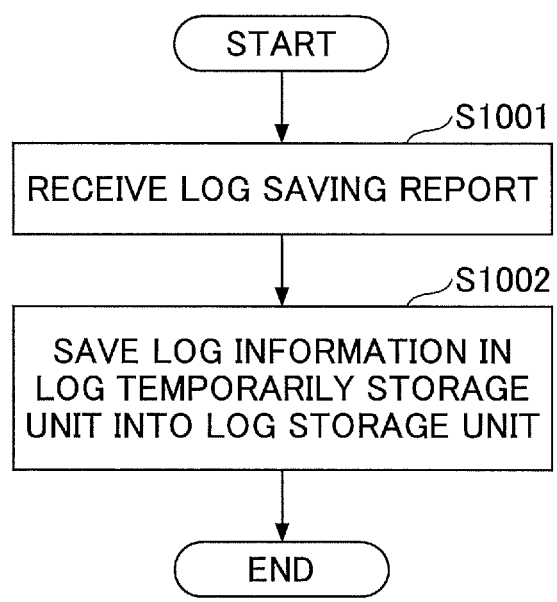
FIG. 10 is a flowchart depicting an example of a reception process for log saving report in the log saving process according to the embodiment.

Next, a process when receiving the log saving report 3000 from the image forming apparatus 30 in the control device 20 will be described with reference to FIG. 10. FIG. 10 is a flowchart depicting an example of a process of receiving the log saving report in the log saving process according to the embodiment.

The report reception unit 204 of the control device 20 receives the log saving report 3000 from the image forming apparatus 30 (step S1001).

Next, when the log saving report 3000 is received by the report reception unit 204, the log saving unit 205 of the control device 20 stores (accumulates) log information 1000 of the log temporary storage unit 206 in the log storage unit 207 (step S1002). Therefore, log information 1000 including log information of an error detected by the detection unit 301 is stored in the log storage unit 207. Accordingly, for example, a user such as an administrator of the print system 1 becomes able to take a variety of measures for preventing an occurrence of an error, based on log information 2000 stored in the log storage unit 207.

As described above, in the print system 1 according to the embodiment, when a major error occurs in the control device 20 that manages log information, after restarting the control device 20, log information of the error is saved in the control device 20. Therefore, in the print system 1 according to the embodiment, when an error occurs in the control device 20 that manages log information, loss of log information of the error can be prevented.

In the technique disclosed in Japanese Patent No. 5121518, for example, when log information is managed by a DFE, log information pertaining to an occurrence of error may not be saved. For example, when, as a result of an occurrence of error in a DFE, the DFE is frozen, log information pertaining to the error that has occurred may not be saved.

According to the embodiment, saving log information when an error occurs can be supported.

Further, the present invention is not limited to these embodiments, but various variations and modifications may be made without departing from the scope of the present invention.

What is claimed is:

1. An information processing system comprising:
   a Digital Front End (DFE) configured to receive a print job from a terminal device, to rasterize the print job to generate print data for printing, and to manage an error log in memory of the DFE; and
   an image forming apparatus coupled to the DFE and configured to receive the print data from the DFE, and to detect an error after initiating printing of the print data;
   wherein the image forming apparatus includes memory storing an association of error identifiers, error cause equipment, and timing for error reporting;
   wherein the image forming apparatus includes a processor that, in response to detecting the error, acquires an error identifier of the error, determines the DFE caused the error based on the error cause equipment associated with the error identifier, and determines to delay reporting of the error to the DFE until after a reboot of the DFE based on the timing for error reporting associated with the error identifier; and
   wherein in response to the reboot of the DFE, the processor sends a report of the error to the DFE for storing in the error log in the memory of the DFE.

2. The information processing system according to claim 1, wherein the processor is configured to determine to immediately report errors to the DFE if the timing for reporting corresponding with error identifiers in the association stored in memory of the image forming apparatus indicates immediate reporting.

3. The information processing system according to claim 1, wherein the processor is configured to prompt a user to restart the DFE in response to determining to delay reporting of the error to the DFE until after a reboot of the DFE.

4. The information processing system according to claim 1, wherein the processor is configured to determine whether to delay reporting of the error based on content of the error.

5. A method comprising:
   receiving, at a Digital Front End (DFE), a print job from a terminal device;
   rasterizing, at the DFE, the print job to generate print data for printing;
   managing an error log in memory of the DFE;
   receiving, at an image forming apparatus coupled to the DFE, the print data from the DFE
   storing, in memory of the image forming apparatus, an association of error identifiers, error cause equipment, and timing for error reporting;
   in response to detecting an error after initiating printing of the print data:
      acquiring, at the image forming apparatus, an error identifier of the error;
      determining the DFE caused the error based on the error cause equipment associated with the error identifier, and
      determining to delay reporting of the error to the DFE until after a reboot of the DFE based on the timing for error reporting associated with the error identifier; and
   in response to the reboot of the DFE:
      sending a report of the error to the DFE for storing in the error log in the memory of the DFE.

* * * * *